(12) United States Patent
Dixit et al.

(10) Patent No.: US 11,661,556 B2
(45) Date of Patent: May 30, 2023

(54) PRE-TREATMENT PROCESS FOR CONVERSION OF RESIDUAL OILS IN A DELAYED COKER UNIT

(71) Applicant: Indian Oil Corporation Limited, Mumbai (IN)

(72) Inventors: Shivam Ashok Dixit, Faridabad (IN); Ponoly Ramachandran Pradeep, Faridabad (IN); Jitumoni Brahma, Faridabad (IN); Terapalli Hari Venkata Devi Prasad, Faridabad (IN); Satyen Kumar Das, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/809,211

(22) Filed: Jun. 27, 2022

(65) Prior Publication Data

US 2022/0411703 A1    Dec. 29, 2022

(30) Foreign Application Priority Data

Jun. 29, 2021    (IN) .............................. 202121029202

(51) Int. Cl.
*C10G 53/08*    (2006.01)
*C10G 9/00*    (2006.01)
(Continued)

(52) U.S. Cl.
CPC ............ *C10G 53/08* (2013.01); *C10G 9/005* (2013.01); *C10G 9/007* (2013.01); *C10G 25/003* (2013.01);
(Continued)

(58) Field of Classification Search
None
See application file for complete search history.

(56) References Cited

U.S. PATENT DOCUMENTS 3,846,288 A    11/1974    Chun et al.
5,891,325 A    4/1999    Bearden et al.
(Continued)

FOREIGN PATENT DOCUMENTS

CA    2294952 C    6/2005
WO    2004005434 A1    1/2004

OTHER PUBLICATIONS

Khan et al., "Removal of Naphthenic Acids from High Acid Crude via Esterification with Methanol", Fuel Processing Technology, May 15, 2017, pp. 123-130, 165.
(Continued)

*Primary Examiner* — Tam M Nguyen
(74) *Attorney, Agent, or Firm* — Workman Nydegger

(57) ABSTRACT

The present invention relates to a sequential thermo-chemical treatment along with adsorption-based pre-treatment process for residual oils having a very high naphthenic acid content. First stage of the process is a thermal pre-treatment step which results into generation of hydrocarbon stream with a reduced naphthenic acid content due to high temperature. In second stage of pre-treatment, generated hydrocarbon stream from stage-1 is subjected to esterification reaction with alcohol, such as methanol, to further reduce the TAN of hydrocarbon stream. After recovery of alcohol from the reaction mixture, depending on TAN reduction required reaction mixture may be subjected to an adsorption stage, third stage pre-treatment, where an adsorbent mixture comprising of FCC spent catalyst is used to adsorb the TAN
(Continued)

of feed hydrocarbon stream. The treated hydrocarbon stream is then co-processed with DCU feed stock for producing lighter hydrocarbons.

12 Claims, 5 Drawing Sheets

(51) Int. Cl.
    *C10G 25/00*     (2006.01)
    *C10G 31/06*     (2006.01)

(52) U.S. Cl.
    CPC ....... *C10G 31/06* (2013.01); *C10G 2300/107* (2013.01); *C10G 2300/1077* (2013.01); *C10G 2300/203* (2013.01); *C10G 2300/4006* (2013.01); *C10G 2300/4012* (2013.01); *C10G 2300/4031* (2013.01); *C10G 2300/701* (2013.01)

(56) References Cited

U.S. PATENT DOCUMENTS

| | | | |
|---|---|---|---|
| 5,910,242 A | 6/1999 | Halbert et al. | |
| 6,190,541 B1 | 2/2001 | Siskin et al. | |
| 2005/0269247 A1* | 12/2005 | Sparks | C10G 9/00 208/131 |
| 2007/0108036 A1* | 5/2007 | Siskin | C10B 31/12 201/28 |
| 2007/0125685 A1* | 6/2007 | Goliaszewski | C10G 21/27 208/251 R |
| 2010/0024283 A1 | 2/2010 | Portilho et al. | |
| 2014/0148609 A1 | 5/2014 | Roussis et al. | |

OTHER PUBLICATIONS

Elsamani et al., "Reduction of naphthenic acids in high TAN crude oil using fluid catalytic cracking catalyst", Petroleum Science and Technology, Dec. 4, 2017, pp. 1-6.

\* cited by examiner

PRE-TREATMENT PROCESS FOR CONVERSION OF RESIDUAL OILS IN A DELAYED COKER UNIT

FIELD OF THE INVENTION

The present invention relates to a sequential thermo-chemical treatment along with an adsorption-based pre-treatment process for residual oils having a very high naphthenic acid content. Product from the pre-treatment stages can be blended/co-processed with the Delayed Coker Unit (DCU) feedstock for producing light distillates. More particularly, the present invention relates to a multi-stage process for pre-treating high naphthenic acid content residual oils prior to co-processing in a DCU.

BACKGROUND OF THE INVENTION

Conversion of highly acidic residual oils to fuels is an attractive option for reducing the dependency on crude oil import. One of the methods for its effective utilization is by co-processing in the DCU. However, it cannot be directly processed 100% in a DCU as it may cause corrosion in furnace tubes and other associated equipment due to very high naphthenic acid content. Further, it may also lead to high pressure drop across furnace tubes and transfer lines, where temperatures are very high.

US patent application no. 20140148609A1 discloses thermal treatment of crude algae oils at temperatures in the range of 300-600° C., without catalyst and/or addition of hydrogen to produce a higher grade, cleaner algae oil with reduced oxygen, boiling range, viscosity and/or density, acid number and metal content. Due to a reduced metal content, downstream catalyst deactivation is reduced by thermal treatment of the crude algal oils.

US patent application no. 20100024283A1 describes a process for production of bio-oil by delayed coking with modified feed stock. According to the process, biomass is co-processed along with the typical coker feedstock for production of bio-oils. The percentage blending of biomass in fresh coker feedstock varies in the range of 0.5 to 30 vol %.

U.S. Pat. No. 5,910,242 describes a process for TAN reduction of acidic crude with hydrogen treat gas in presence of a hydrotreating catalyst. This invention relates to a process for reducing the total acid number of an acidic crude oil which comprises contacting the crude oil with a hydrotreating catalyst at a temperature from 200 to 370° C. in the presence of a hydrogen treat gas containing hydrogen sulfide at a total pressure from about 239 to 13,900 kPa.

U.S. Pat. No. 5,891,325 relates to a process for reducing organic acids in petroleum feeds containing organic acids comprising of thermal treatment of the stream in a thermal reaction zone comprising a plurality of stages with an inert gas, to produce a volatile organic acid containing hydrocarbon fraction and a non-volatile hydrocarbon fraction; treating the volatile hydrocarbon fraction to neutralize a fraction of organic acids contained and to produce a treated hydrocarbon fraction; collection of the non-volatile fraction from the reaction zone and blending the volatile fraction with the non-volatile fraction for reducing the TAN of crude oils.

U.S. Pat. No. 6,190,541 describes a process for decreasing the acidity of an organic acid containing petroleum oil by contacting the organic acid with an effective amount of alcohol and a trace amount of base selected from Group IA and IIA metal carbonates, hydroxides, phosphates, and mixtures of a hydroxide and phosphate at a temperature and under conditions sufficient to form ester of corresponding alcohol.

WO patent publication no. 2004005434A1 describes a process for reducing the naphthenic acidity of petroleum oils, or their liquid fractions by using thermal treatment in the presence of adsorbents such as FCC spent catalyst.

US patent application no. 3846288A discloses a process for treating a hydrocarbon fraction having carboxylic acid content as measured by an acid number more than 0.1 to produce a product having a reduced carboxylic acid content as measured by an acid number of less than 0.1, by treating it with methanol and a solid catalyst. The catalyst comprises oxide of a metal selected from the group consisting of the metal from group IVB; aluminum; germanium; tin; lead; zinc; and cadmium. The hydrocarbon fraction is also heated up from 200° F. to the thermal cracking temperature of the said fraction.

CA patent application no. 2294952C relates to a thermal process for reducing the total acid number of crude oils. The treated liquid has a TAN value of ≤2.0 mg KOH/gm oil. The thermal treatment is carried out at a temperature of 343.3-426.7° C. in a two-stage bubble column.

Mustafa Abbas Mustafa et al. describe a process which uses fluid catalytic cracking (FCC) catalyst to reduce naphthenic acids (NAs) in a high TAN crude oil sample. It is shown that the FCC catalyst can reduce NAs with a reduction in TAN of 15.9% and 13.22% at an oil/catalyst ratio of 3:1 and 4:1, respectively. Thermal pre-treatment of the FCC catalyst, in combination with an increase in the temperature of the crude oil to 190° C., resulted in an overall TAN reduction of 22.34%.

Jaehoon Kim et al. describe a process which in the absence of a catalyst or external hydrogen, enables effective removal of the NAs contained in high acid crudes, using methanol at moderate temperature and moderate pressure.

Thermal cracking processes such as delayed coking is employed for conversion of residual oils to valuable distillates. However, feedstock having a TAN value greater than 0.5 mg KOH/gm oil cannot be processed directly using the conventional DCU metallurgy but requires to be blended with vacuum residue feedstock to bring the net DCU feed TAN to <0.5 mg KOH/gm oil. In presence of high temperatures, high TAN feedstock will lead to severe corrosion in the equipment associated with DCU, leading to loss for a refinery. For residual oils having a high TAN value in the range of 20-100 mg KOH/gm oil, blending quantity with DCU feed stock is restricted to as low as 0.5 wt. %.

The prior arts available for reducing TAN of residual oils have the following shortcomings:
  Some prior arts teach the use of thermal treatment for reducing TAN content of oils. However, for residual oils having a very high TAN content in the range of 20-100 mg KOH/gm oil, even after thermal treatment, TAN of treated oil may be sufficient enough to cause corrosion in the refinery units leading to losses for a petroleum refinery.
  To process residual oils by only thermal treatment, refineries may have to revamp the existing unit metallurgy to process the product of thermal treatment leading to significant additional costs.
  Use of various hydrotreatment-based techniques for TAN reduction add up to the processing cost.

Accordingly, there is a need for an approach that resolves problems of the state of the art and provides an efficient and integrated process for reducing high TAN of residual oils before subjecting the feed stock to thermal cracking in a DCU for distillate production. The present invention pre-treats residual oil feedstock having a very high TAN value through multistage pre-treatment process comprising of sequential thermo-chemical treatment along with adsorption-based pre-treatment. This results in increased co-processing of treated residual oils along with DCU feedstock thereby leading to production of light distillates without any major impact on the equipment associated with DCU. This may enable the DCU of a refinery to produce fuel from alternative feedstock and reduce dependence on petroleum-based feeds. The treated feedstock stream may also be co-processed without replacing the vacuum residue feed stock by utilizing the over design capacity of units, resulting into yield benefits in terms of lighter hydrocarbons.

The pre-treated stream having a lower TAN in comparison to untreated feedstock can be blended in higher quantities with DCU feed stock resulting into production of light distillates. Therefore, a combination of processes employed in the present invention aid in bringing down the feed TAN values to sufficiently low levels so that blending quantity with DCU feed stock can be higher. This process shall enable the DCU of a refinery to process alternative feed stock and prepare them for the future with dwindling crude reserves. Such process is also beneficial in terms of its ease of integration with the existing DCUs. It will also provide flexibility in terms of feed type processed in a DCU.

Objectives of the Present Invention

The primary objective of the present invention is to provide a multistage process of pre-treating heavy high TAN oils prior to co-processing in the DCU. The multistage process uses a sequential combination of thermal treatment, esterification based reactive treatment along with FCC spent catalyst based adsorbent pre-treatment for reducing feed TAN to sufficiently low values.

Another objective of the present invention is to treat feed with a very high TAN (20-100 mg KOH/gm oil) and high Conradson Carbon Residue (CCR) in the range of (3-25 wt. %).

Another objective of the present invention is to provide a flexible way of handling feed in terms of easy integration with the existing DCUs.

Yet another objective of the present invention is to provide an apparatus for sequential combination of thermal treatment, esterification based reactive treatment along with FCC spent catalyst based adsorbent pre-treatment for reducing feed TAN to very low values.

Another objective of the present invention is to increase the quantity of high TAN oils, pre-treated using steps described in the present invention, for co-processing with the DCU feed stock to produce distillates and coke.

SUMMARY OF THE INVENTION

The present invention discloses a multistage process of pre-treating heavy high TAN oils prior to co-processing in the DCU for reducing feed TAN to sufficiently low values. The multistage process uses a sequential combination of thermal treatment, esterification based reactive treatment along with FCC spent catalyst based adsorbent pre-treatment.

DESCRIPTION OF THE INVENTION

Figure 1:
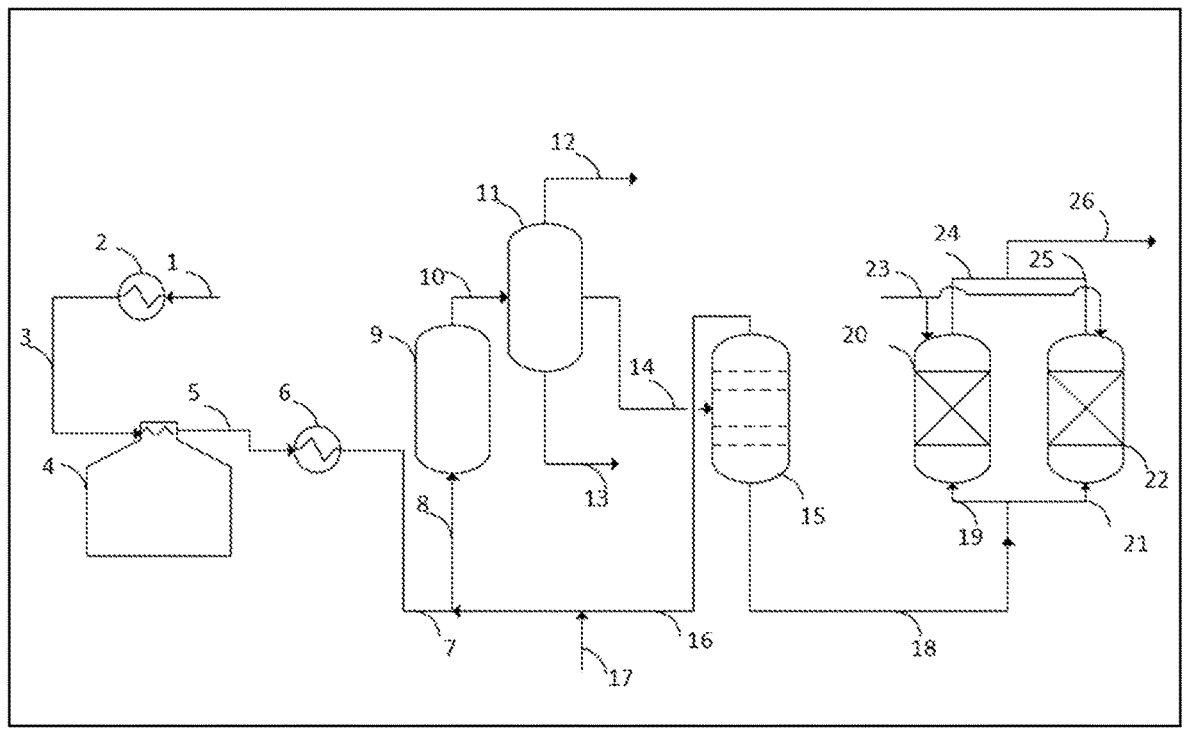
FIG. 1 represents a schematic process flow diagram of embodiment-1 of invented process.

Those skilled in the art will be aware that the present disclosure is subject to variations and modifications other than those specifically described. It is to be understood that the present disclosure includes all such variations and modifications. The disclosure also includes all such steps of the process, features of the system, referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have their meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally equivalent products and methods are clearly within the scope of the disclosure, as described herein.

The present invention provides a multistage process for pre-treating high naphthenic acid containing (high TAN) residual oils prior to co-processing in a delayed coker unit (DCU). It uses a sequential combination of thermal treatment, esterification-based reactive treatment along with fluid catalytic cracking (FCC) spent catalyst-based adsorbent pre-treatment, for reducing feed TAN to sufficiently low values. Product from the pre-treatment stages can be blended/co-processed with the DCU feed stock for producing light distillates.

In an embodiment of the invention, the process can treat feed with a very high TAN (20-100 mg KOH/gm oil) and high Conradson Carbon Residue (CCR) in the range of 3-25 wt. %.

In another embodiment of the invention, Stage I of the process is a thermal pre-treatment step, which results into generation of hydrocarbon stream with a reduced naphthenic acid content due to high temperature. In stage II of pre-treatment, generated hydrocarbon stream from stage I is subjected to esterification reaction with alcohol, such as methanol, to further reduce the TAN of hydrocarbon stream. After recovery of alcohol from the reaction mixture, depending on the TAN reduction required, reaction mixture may be subjected to an adsorption stage, stage III pre-treatment, where an adsorbent mixture comprising of FCC spent catalyst is used to adsorb the TAN of feed hydrocarbon stream.

In yet another embodiment of the invention, the process provides flexibility in terms of feed handling and easy integration with the existing DCUs. It enables the DCU of a refinery to produce fuel from alternative feed stock and reduce dependence on petroleum-based feeds. The treated stream may also be co-processed without replacing the vacuum residue feed stock by utilizing the over design capacity of units, resulting into yield benefits in terms of lighter hydrocarbons. It does not make use of any hydrotreatment based technique thus resulting in additional cost savings. The present invention provides an attractive option for converting high TAN residual oils to valuable distillates using DCU.

In an embodiment of the present invention, as shown in FIG. 1, high TAN residual oil feedstock (1) is routed to a heat exchanger-1 (2) of the DCU for pre-heating to obtain a pre-heated stream (3). Pre-heated stream (3) is thereafter heated in the preheating zone of DCU furnace (4) to obtain a stream (5). Subsequently, after heating stream (5) in heat exchanger-2 (6) of the DCU, heated stream (7) mixes with fresh alcohol, such as methanol, stream (17) and recycled alcohol stream (16) and forms stream (8) which is routed to a soaker vessel (9). Alcohol stream is added before the soaker vessel for providing additional contact time for higher TAN reduction. Soaker effluent stream (10) is routed to a surge vessel or separator-1 (11) for removal of any non-condensable gases (12) and residue (13). The condensed liquid stream (14) is thereafter sent for alcohol recovery in separator-2 (15). The treated stream (18) from second stage pre-treatment is routed to an adsorbent zone for further TAN reduction. The stream may enter the adsorbent bed-1 (20) through line (19) or adsorbent bed-2 (22) through line (21). The adsorbent used may be FCC spent catalyst or mixture thereof introduced through make-up line (23). The treated stream from either of the beds as per mode of operation (24) or (25) is sent to DCU through line (26).

Figure 2:
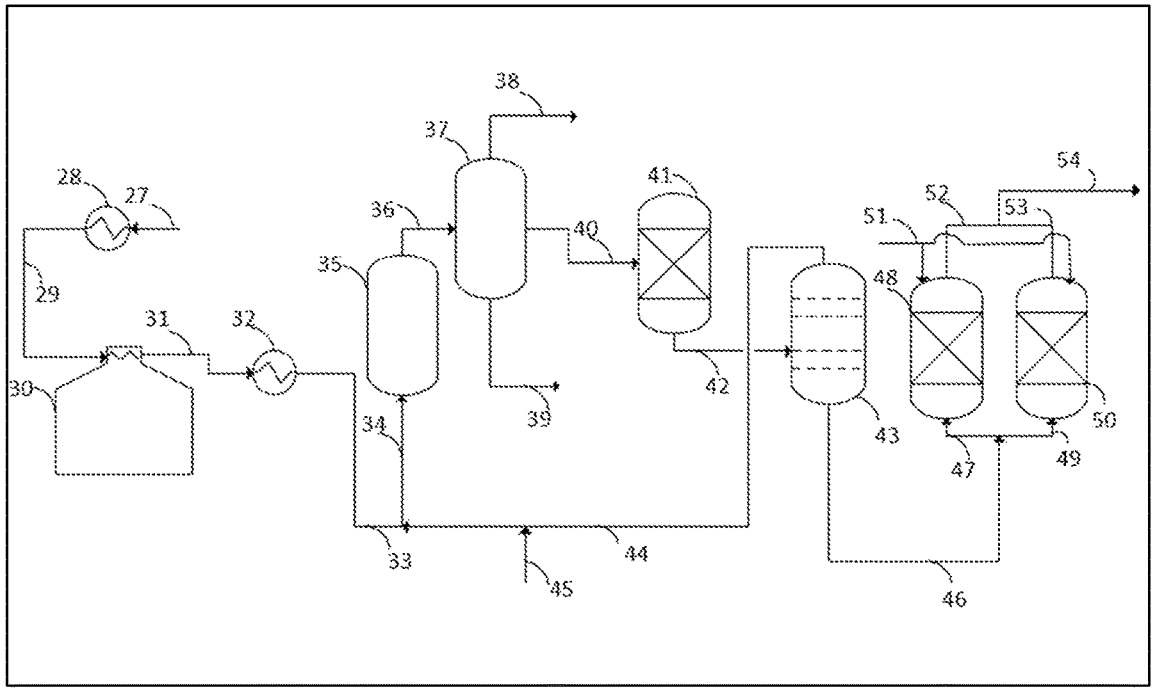
FIG. 2 represents a schematic process flow diagram of embodiment-2 of invented process.

In another embodiment of the invention, as shown in FIG. 2, high TAN residual oil feedstock (27) is routed to a heat exchanger-1 (28) for pre-heating. Pre-heated stream (29) is thereafter heated in the preheating zone of DCU furnace (30). Subsequently, after heating in heat exchanger-2 (32), heated stream (33) mixes with fresh alcohol such as methanol stream (45) and recycled alcohol stream (44) and forms stream (34) which is routed to a soaker vessel (35). Alcohol stream is added before the soaker vessel for providing additional contact time for higher TAN reduction. Soaker effluent stream (36) is routed to a surge vessel or separator-1 (37) for removal of any non-condensable gases (38) and residue (39). The condensed liquid stream (40) is thereafter routed to an esterification reactor (41). The reactor effluent (42) is sent for alcohol recovery in separator-2 (43). The treated stream from second stage pre-treatment (46) is routed to an adsorbent zone for further TAN reduction. The stream may enter the adsorbent bed-1 (48) through line (47) or adsorbent bed-2 (50) through line (49). The adsorbent used may be FCC spent catalyst or mixture thereof introduced through make-up line (51). The treated stream (52) or (53) from either of the beds as per mode of operation is sent to DCU through line (54).

Figure 3:
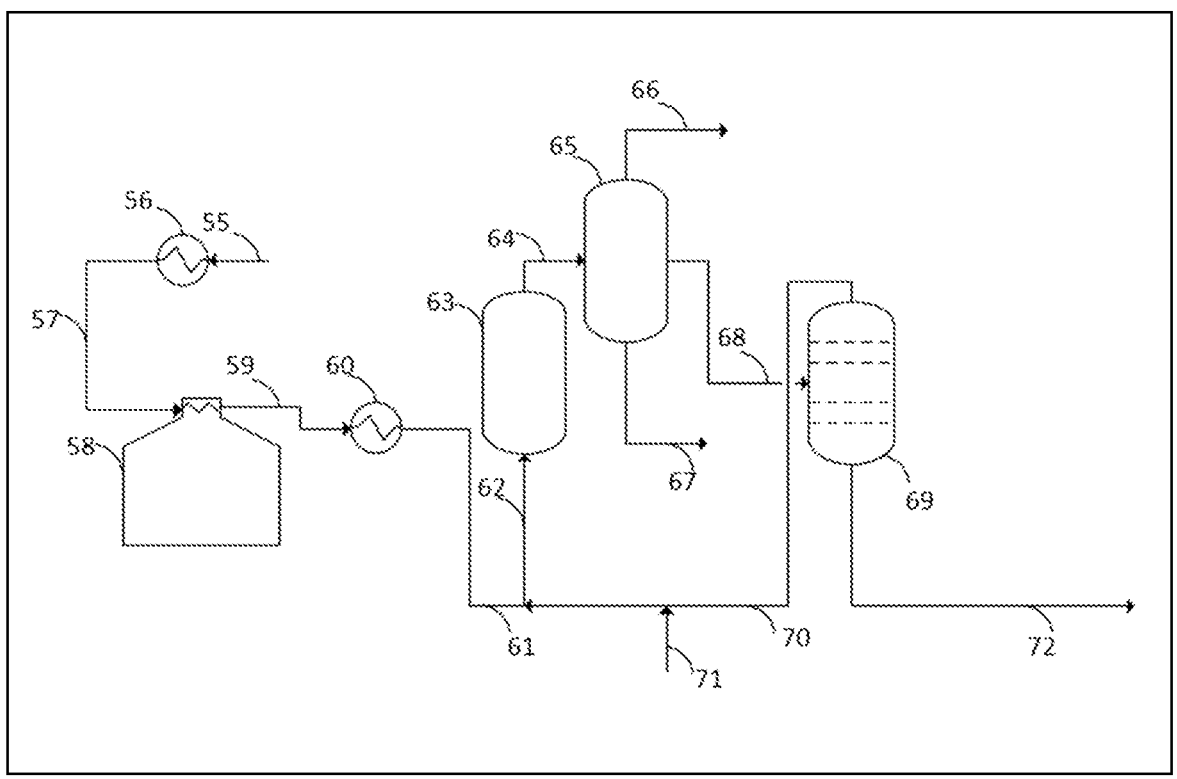
FIG. 3 represents a schematic process flow diagram of embodiment-3 of invented process.

In yet another embodiment of the present invention, as shown in FIG. 3, high TAN residual oil feedstock (55) is routed to heat exchanger-1 (56) for pre-heating. Pre-heated stream (57) is thereafter heated in the preheating zone of DCU furnace (58). Subsequently, after heating in Heat exchanger-2 (60), heated stream (61) mixes with fresh alcohol such as methanol stream (71) and recycled alcohol stream (70) and forms stream (62) which is routed to a soaker vessel (63). Alcohol stream is added before the soaker vessel for providing additional contact time for higher TAN reduction. Soaker effluent stream (64) is routed to a surge vessel or separator-1 (65) for removal of any non-condensable gases (66) and residue (67). The condensed liquid stream (68) is thereafter sent for alcohol recovery in separator-2 (69). The treated stream (72) with sufficiently low TAN value is routed to DCU for co-processing.

Figure 4:
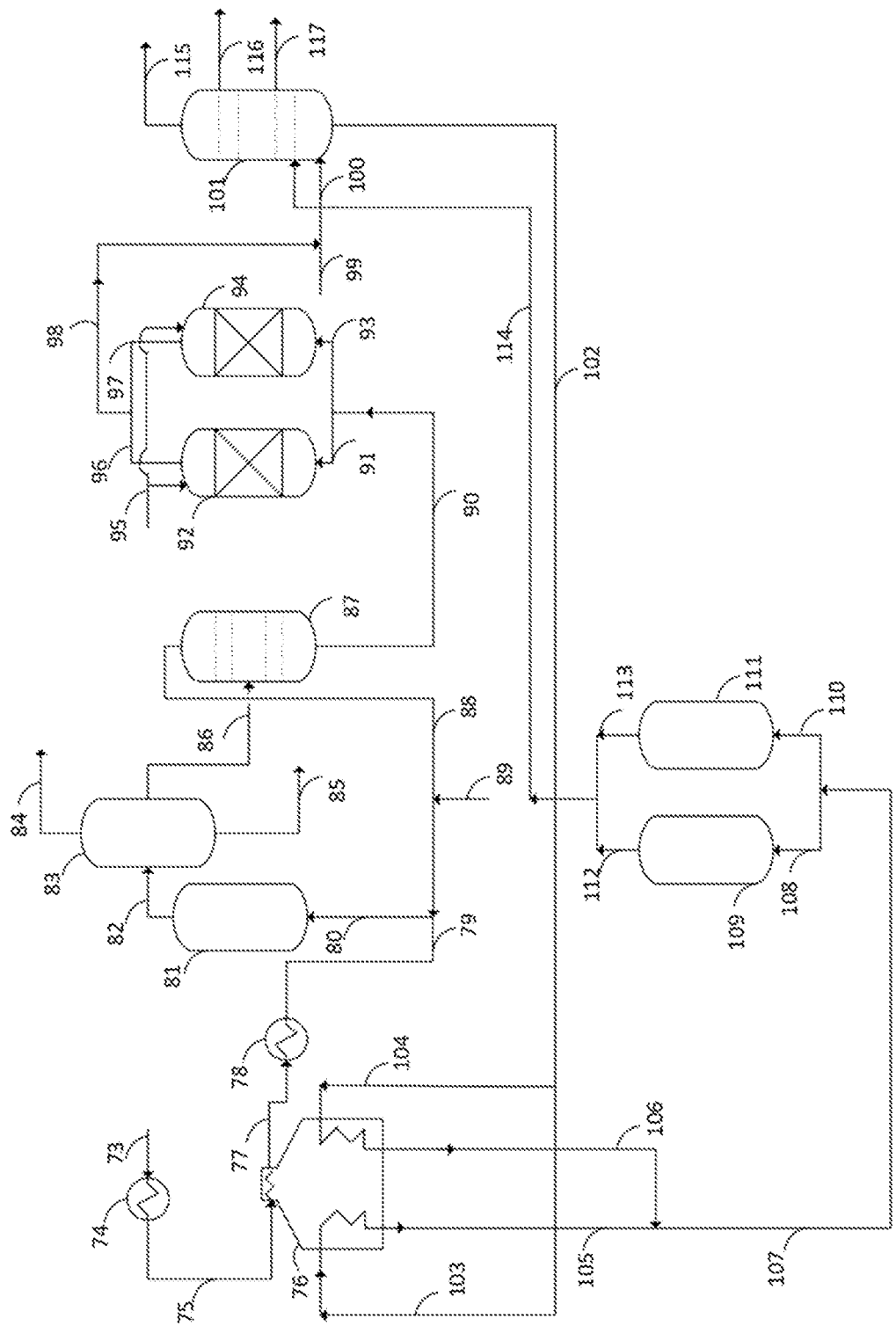
FIG. 4 represents a schematic process flow diagram of embodiment-4 of invented process.

In yet another embodiment of the invention, as shown in FIG. 4, high TAN residual oil is treated using process described in FIG. 1 (embodiment 1) to obtain treated stream (98). This treated stream (98) is mixed with fresh residual feedstock (99) to generate mixed primary feed stream (100) which is routed to Main Fractionator (101). Secondary Feed (102) from the main fractionator comprising internal recycle of heavy components of coke drum vapor and fresh feed is thereafter routed to DCU furnace (76) for initiating cracking reactions. Furnace effluent stream (107) is routed to either of the Coke drums (109) or (111) depending upon whichever is in the filling cycle. Cracked vapor stream (114) from either of the coke drums is routed to the main fractionator (101) for separating into gases (115), Light Coker gasoil (116) and Heavy Coker gasoil (117).

Figure 5:
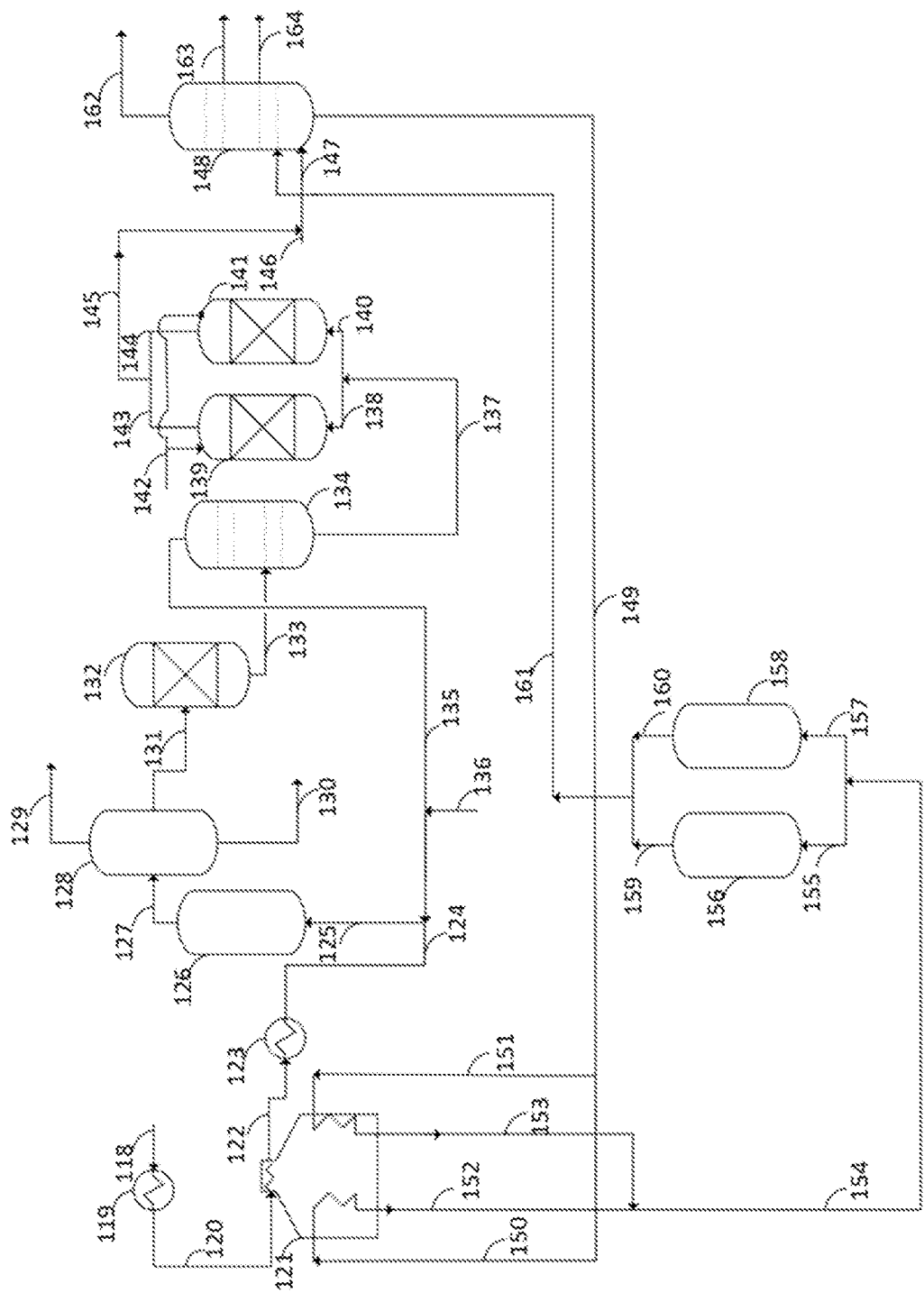
FIG. 5 represents a schematic process flow diagram of embodiment-5 of invented process.

In yet another embodiment of the invention, as shown in FIG. 5, high TAN residual oil is treated using process described in FIG. 2 (embodiment 2) to obtain treated stream (145). This treated stream (145) is mixed with fresh residual feedstock (146) to generate mixed primary feed stream (147) which is routed to Main Fractionator (148). Secondary Feed (149) from the main fractionator comprising internal recycle and fresh feed is thereafter routed to furnace (121) for initiating cracking reactions. Heated stream from furnace outlet (154) is routed to either of the Coke drums (156) or (158) depending upon whichever is in the filling cycle. Cracked vapor stream (161) from either of the coke drums is routed to the main fractionator (148) for separating into gases (162), Light Coker gasoil (163) and Heavy Coker gasoil (164).

Figure 6:
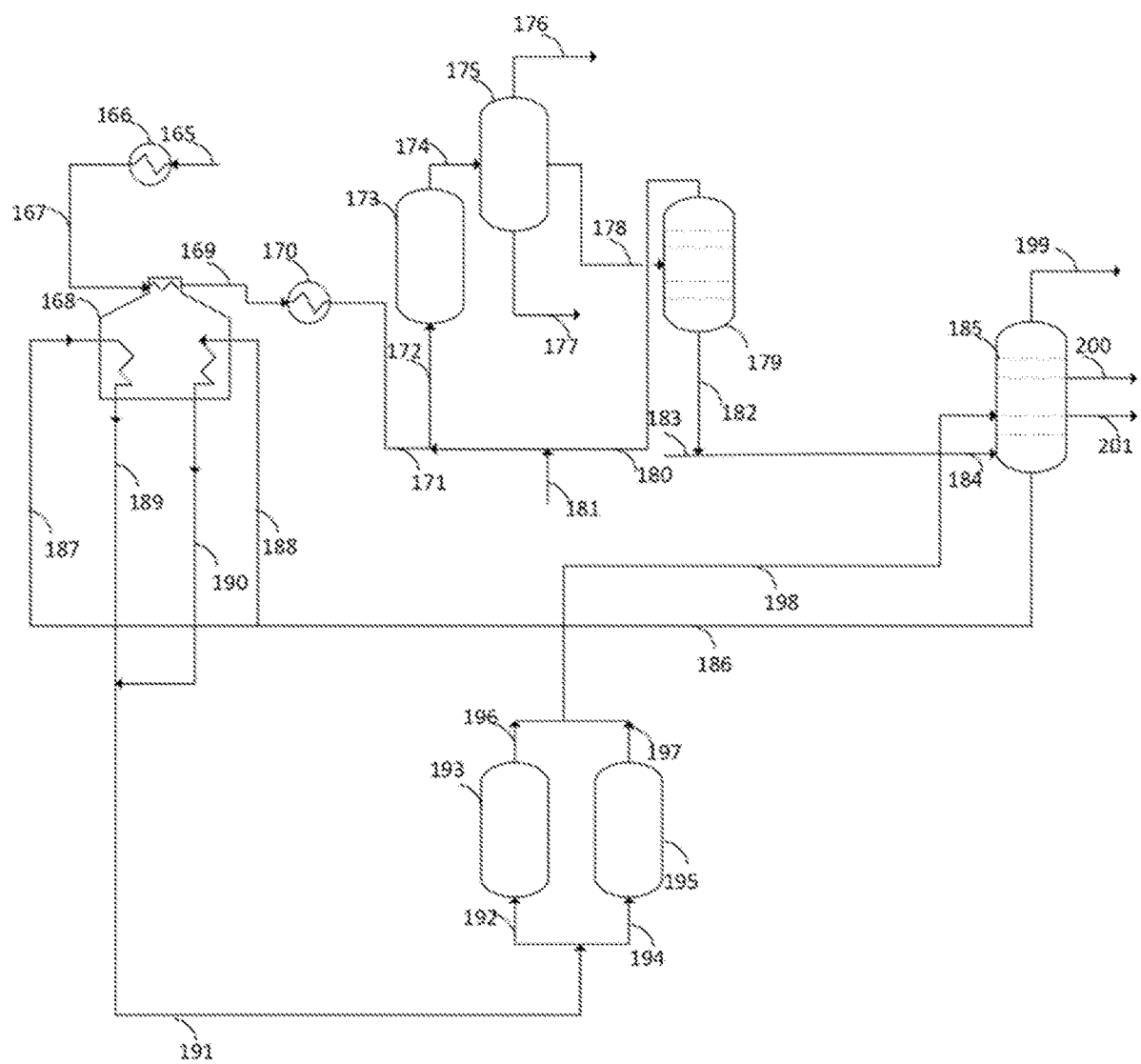
FIG. 6 represents a schematic process flow diagram of embodiment-6 of invented process.

In yet another embodiment of the invention, as shown in FIG. 6, high TAN residual oil is treated using process described in FIG. 3 (embodiment 3) to obtain treated stream (182). This treated stream (182) is mixed with fresh residual feedstock (183) to generate mixed primary feed stream (184) which is routed to Main Fractionator (185). Secondary Feed (186) from the main fractionator comprising internal recycle and fresh feed is thereafter routed to furnace (168) for initiating cracking reactions. Heated stream from furnace outlet (191) is routed to either of the Coke drums (193) or (195) depending upon whichever is in the filling cycle. Cracked vapor stream (198) from either of the coke drums is routed to the main fractionator (185) for separating into gases (199), Light Coker gasoil (200) and Heavy Coker gasoil (201).

In another preferred embodiment, the present invention discloses a system for pre-treating residual oils prior to co-processing in a DCU in multiple reactors to reduce the naphthenic acid content, wherein the system comprises a residual oil feedstock, an alcohol and a FCC spent catalyst as active components. The alcohol is selected from a group consisting of 1 to 8 carbon atoms, and the alcohol preferably comprises methanol.

In yet another embodiment, the present invention discloses a multistage pre-treatment apparatus for reducing naphthenic acid content of residual oils prior to co-processing in a DCU comprising a first heat exchanger-1 (2) for pre-heating a high TAN residual oil feedstock (1); a pre-heating zone of a DCU furnace (4); a second heat exchanger-2 (6) for heating stream (5); a soaker vessel (9) to obtain a soaker effluent stream (10); a surge vessel or a separator-1 (11) for removal of any non-condensable gases (12) and residue (13) to obtain a condensed liquid stream (14); a separator-2 (15) for alcohol recovery from condensed liquid stream (14); and an adsorbent bed-1 (20) and an adsorbent bed-2 (21) for further TAN reduction.

In another embodiment, the present invention provides a process for co-processing pre-treated oils in a DCU, wherein the process comprises mixing a pre-treated stream (98) at a particular rate with a heavy residue feedstock (99) to obtain a primary mixed feed (100), wherein the primary mixed feed comprises treated oil in a range varying from 0.5 to 5 wt. %, and preferably in a range of 0.5 to 3 wt. %. Routing the primary mixed feed to a main fractionator (101) operating in a range of 200-350° C. so as to avoid coking, where it mixes with an internal recycle of heavy components of coke drum vapor and a fresh feed to obtain a secondary feed (102). Routing the secondary feed (102) to a DCU furnace (76) for initiating thermal cracking reactions by heating to thermal cracking temperature and then routing the furnace effluent stream (107) to a coke drum (109) or (111) for conversion into product vapors and coke.

The present invention is further illustrated based on the disclosed embodiments through several non-limiting working examples.

Feedstock:

The liquid hydrocarbon feedstock to be used in the process is selected from hydrocarbon feed streams having high TAN contents in the range of 20-100 mg KOH/gm oil, CCR in the range of 5 to 30, density in the range of 1.01 to 1.07 g/cc and carbon content in the range of 75 to 90 wt. %. Alcohol may be chosen from C1 to C8 carbon numbers. Adsorbent may be selected from commercially available zeolite-based adsorbents, basic oxides like calcium hydroxide or more specifically FCC spent catalyst from petroleum refineries.

Residue feedstock to DCU may be selected from Vacuum Residues, Atmospheric residues, aromatic tars, Clarified Oil etc.

Process Conditions:

The thermal treatment of high TAN residual oils may be carried out in the temperature range of 200-400° C. at a pressure in the range of 1-10 Kg/cm$^2$ (g) and residence time in the range of 10 to 100 minutes. Alcohol may be added in the ratio of 1-40 wt %, more preferably in the range of 1-30 wt %. In the adsorption stage of process, thermo-chemically treated high TAN oil feed is contacted with an adsorbent in an adsorption column at adsorbent to feed ratio of 1:9 to 1:4, in the temperature range of 150-250° C. and residence time varying between 10-240 mins. The adsorption can be of pressure swing type where regenerated adsorbent column is receiving the feed while the saturated adsorbent column is under regeneration cycle.

Coke drum of DCU operates in the range of 475-505° C. with a filling or cycle time varying in the range of 12-30 hrs.

Experimental Data:

EXAMPLE 1

In order to simulate very high TAN residual oil, a heavy oil residue sample was doped with model naphthenic acid compound having average molecular weight of approximately 257 and a residual oil having property as described in Table-1 was prepared.

TABLE 1

Property of high TAN residual oil

| Property | High TAN residual oil |
|---|---|
| Density @ 15° C. g/cc | 1.04 |
| API gravity | 4 |
| CCR, wt. % | 20.6 |
| Carbon, wt. % | 76 |
| KVat 100° C. | 124 |
| TAN, mg KOH/gm oil | 95.8 |

Such high TAN oil was treated thermally, and product stream was analyzed for TAN. Product TAN & experimental condition no. 1 are provided in Table-2.

TABLE 2

Experimental conditions & Product property

| S/N | Operating Parameter | Experiment no. 1 |
|---|---|---|
| 1. | Temperature, ° C. | 350 |
| 2. | Pressure, Kg/cm$^2$ (g) | 1 |
| 3. | Residence time, mins | 60 |
| 4. | Product TAN, mg KOH/gm oil | 39.1 |

Further, 0.4 gm of high TAN residual oil as prepared above was mixed with 99.6 gm of Vacuum residue feed stock. The resulting blend TAN was 0.5 mg KOH/gm oil.

EXAMPLE 2

Experiments were conducted using high TAN residual oil with properties described in Table-1 and alcohol (C1) at different compositions as mentioned in Table-3. The product stream was collected and analyzed for TAN. Product TAN & experimental conditions no. 2 and 3, are provided in Table-3.

TABLE 3

Experimental conditions & Product property

| S/N | Operating Parameter | Experiment no. 2 | Experiment no. 3 |
|---|---|---|---|
| 1. | Feed TAN | 95.8 | 95.8 |
| 2. | Temperature, ° C. | 350 | 350 |
| 3. | Oil/alcohol ratio | 19:1 | 4:1 |
| 4. | Pressure, Kg/cm$^2$ (g) | 1 | 1 |

TABLE 3-continued

Experimental conditions & Product property

| S/N | Operating Parameter | Experiment no. 2 | Experiment no. 3 |
|---|---|---|---|
| 5. | Residence time, mins | 60 | 60 |
| 6. | Product TAN, mg KOH/gm oil | 26.1 | 15.5 |

EXAMPLE 3

To simulate the adsorption stage of the pre-treatment process, product collected in Experiment no. 2 was mixed with an adsorbent at different adsorbent to feed ratios. The resultant collected product was analyzed for TAN. Experimental conditions no. 4 and 5, are provided in Table-4.

TABLE 4

Experimental conditions & Product property

| S/N | Operating Parameter | Experiment no. 4 | Experiment no. 5 |
|---|---|---|---|
| 1. | Feed TAN | 26.1 | 26.1 |
| 2. | Adsorbent | FCC spent catalyst | FCC spent catalyst |
| 3. | Temperature, °C | 250 | 250 |
| 4. | Adsorbent/feed ratio | 1:9 | 1:4 |
| 5. | Pressure, Kg/cm$^2$ (g) | 1 | 1 |
| 6. | Residence time, mins | 240 | 240 |
| 7. | Product TAN, mg KOH/gm oil | 21.3 | 17.3 |

Further, 2.4 gm of product derived from Experimental condition no. 5 was mixed with 97.6 gm of Vacuum Residue feed stock. Resulting blend had a TAN of 0.5 mg KOH/gm of oil.

EXAMPLE 4

The product from Experimental condition no. 3 was mixed with typical Vacuum Residue (VR) feed stock as per conditions provided in Table-5 and thermally cracked in a laboratory scale batch thermal cracker unit. Operating conditions & product yield in experimental condition no. 5 is provided in Table-5.

TABLE 5

Experimental conditions & Product property

| S/N | Operating parameter | Experiment no. 5 |
|---|---|---|
| 1. | Vacuum residue: Product | 98:2 |
| 2. | Temperature, ° C. | 487 |
| 3. | Pressure, Kg/cm$^2$ (g) | 1 |
| | Product Yield, wt. % | |
| 1. | Gas + Liquid | 69 |
| 2. | Coke | 31 |

We claim:

1. A multistage process for pre-treating a high naphthenic acid content heavy oil feedstock prior to co-processing in a Delayed Coker Unit (DCU), the process comprising:
  a) pre-heating the high naphthenic acid content heavy oil feedstock in a heat exchanger-1 of the DCU to obtain a pre-heated stream;
  b) heating the pre-heated stream in a pre-heating zone of a DCU furnace to obtain a hot stream;
  c) heating the hot stream in a heat exchanger-2 of the DCU to obtain a heated stream;
  d) mixing the heated stream with a fresh alcohol stream and a recycled alcohol stream to form a mixed stream, and wherein the mixed stream is routed to a soaker vessel to obtain a soaker effluent stream;
  e) of removing non-condensable gases and a residue from the soaker effluent stream in a surge vessel or a separator-to obtain a condensed liquid stream;
  f) recovering an alcohol from the condensed liquid stream in a separator-2 to obtain a first treated stream, and the recycled alcohol stream;
  g) passing the first treated stream through an adsorbent bed-1 through a first line or an adsorbent bed-2 through a second line for producing a stream with a reduced Total Acid Number (TAN);
  h) sending an adsorbent through a make-up line; and
  i) sending the stream with reduced TAN from the adsorbent bed-1 or the adsorbent bed-2 to the DCU through a third line for preparing an admixture of the stream with reduced TAN and a residual feedstock of the DCU for co-processing to obtain light distillates.

2. The process as claimed in claim 1, wherein in step (d) the recycled alcohol stream along with the fresh alcohol stream is added to the heated stream before entering the soaker vessel to provide additional contact time for TAN reduction.

3. The process as claimed in claim 1, wherein in step (g) the adsorbent used may be selected from the group consisting of a Fluid Catalytic Cracking (FCC)-spent catalyst, zeolite-based adsorbents, basic oxides, and a combination thereof, wherein the basic oxides comprise calcium hydroxide.

4. The process as claimed in claim 1, wherein in step (e) a condensed liquid stream is routed to an esterification reactor; and
  wherein a reactor effluent is routed to a separator-2 for alcohol recovery to obtain a reactor treated stream, wherein the reactor treated stream is sent to an adsorbent zone.

5. The process as claimed in claim 1, wherein after step (f), the first treated stream is directly sent to the DCU for co-processing.

6. The process as claimed in claim 1, wherein the process uses a combination of a thermal treatment, an esterification-based reactive treatment, and an adsorbent pre-treatment of the high naphthenic acid content heavy oils.

7. The process as claimed in claim 1, wherein the high naphthenic acid content heavy oils have a TAN value in a range of 20-100 mg KOH/g oil.

8. The process as claimed in claim 1, wherein the high naphthenic acid content heavy oils have a Conradson Carbon Residue (CCR) in a range of 3-25 wt. %.

9. The process as claimed in claim 1, wherein the product obtained from the pre-treatment process is blended with a residual oil feedstock of the DCU to produce light distillates.

10. The process as claimed in claim 9, wherein the residual oil feedstock is selected from the group consisting of vacuum residues, atmospheric residues, aromatic tars, a clarified oil, and a crude oil.

11. The process as claimed in claim 1, wherein the high naphthenic acid content heavy oils is heated to a temperature in a range of 200-400° C. at a pressure in a range of 1-10 Kg/cm$^2$ and a residence time in a range of 10-100 minutes in the soaker vessel.

12. The process as claimed in claim 1, wherein the high naphthenic acid content heavy oil feedstock is selected from the group consisting of biomass derived oils, and wastewater sludges.

* * * * *